(12) United States Patent
Burbank et al.

(10) Patent No.: US 11,627,378 B2
(45) Date of Patent: *Apr. 11, 2023

(54) MEDIA PRESENTATION DEVICE WITH VOICE COMMAND FEATURE

(71) Applicant: The Nielsen Company (US), LLC, New York, NY (US)

(72) Inventors: John R. Burbank, New York, NY (US); Kurt Roman Thielen, Maple Grove, MN (US)

(73) Assignee: The Nielsen Company (US), LLC, New York, NY (US)

( * ) Notice: Subject to any disclaimer, the term of this patent is extended or adjusted under 35 U.S.C. 154(b) by 143 days.

This patent is subject to a terminal disclaimer.

(21) Appl. No.: 17/194,581

(22) Filed: Mar. 8, 2021

(65) Prior Publication Data

US 2021/0195293 A1 Jun. 24, 2021

Related U.S. Application Data

(63) Continuation of application No. 16/388,078, filed on Apr. 18, 2019, now Pat. No. 10,972,799.

(60) Provisional application No. 62/780,298, filed on Dec. 16, 2018.

(51) Int. Cl.
| | |
|---|---|
| *H04N 21/478* | (2011.01) |
| *H04N 21/2389* | (2011.01) |
| *H04N 21/658* | (2011.01) |
| *G10L 15/26* | (2006.01) |

(52) U.S. Cl.
CPC ....... *H04N 21/47815* (2013.01); *G10L 15/26* (2013.01); *H04N 21/23892* (2013.01); *H04N 21/6581* (2013.01)

(58) Field of Classification Search
CPC ....... H04N 21/47815; H04N 21/23892; H04N 21/6581; H04N 21/2542; H04N 21/44008; H04N 21/6547; H04N 21/42203; H04N 21/4394; H04N 21/812; G10L 15/26; G06F 3/167
See application file for complete search history.

(56) References Cited

U.S. PATENT DOCUMENTS

| | | | | |
|---|---|---|---|---|
| 8,612,036 | B2 * | 12/2013 | Yamamura | H04N 21/42222 709/227 |
| 10,616,649 | B2 * | 4/2020 | Blake | H04N 21/25891 |
| 2011/0264455 | A1 | 10/2011 | Nelson et al. | |
| 2013/0011006 | A1 | 1/2013 | Petrovic et al. | |
| 2013/0223816 | A1 | 8/2013 | Gharaat et al. | |

(Continued)

OTHER PUBLICATIONS

International Search Report and Written Opinion from International Application No. PCT/US2019/064110, dated Mar. 20, 2020.

*Primary Examiner* — Linda Wong
(74) *Attorney, Agent, or Firm* — McDonnell Boehnen Hulbert & Berghoff LLP

(57) ABSTRACT

A media presentation device determines a voice command associated with media content presented by the media presentation device. The media presentation device then listens for and detects utterance of the determined voice command during presentation of the media content, and the media presentation device responds to the detected utterance by performing an action that facilitates user purchase of the good or service associated with the media content segment.

20 Claims, 3 Drawing Sheets

(56) References Cited

U.S. PATENT DOCUMENTS

| | | |
|---|---|---|
| 2014/0365689 A1 | 12/2014 | Jain et al. |
| 2015/0106505 A1 | 4/2015 | Ramaswamy et al. |
| 2015/0332687 A1 | 11/2015 | Kalampoukas et al. |
| 2015/0382047 A1 | 12/2015 | Van Os et al. |
| 2016/0127759 A1 | 5/2016 | Jung et al. |
| 2016/0140971 A1 | 5/2016 | Papakipos et al. |
| 2016/0261917 A1 | 9/2016 | Trollope et al. |
| 2016/0352793 A1 | 12/2016 | Lee et al. |
| 2017/0094349 A1 | 3/2017 | Maughan |
| 2018/0139500 A1 | 5/2018 | Lee et al. |
| 2019/0037267 A1* | 1/2019 | Gharaat ............... H04N 5/782 |
| 2019/0050545 A1 | 2/2019 | Keret et al. |
| 2019/0129689 A1 | 5/2019 | Maker, III |
| 2019/0206396 A1 | 7/2019 | Chen |
| 2019/0391788 A1* | 12/2019 | Blake .................. G10L 25/54 |
| 2020/0029108 A1 | 1/2020 | Dunker et al. |
| 2020/0029115 A1 | 1/2020 | Dunker et al. |
| 2020/0098379 A1 | 3/2020 | Tai et al. |
| 2020/0184963 A1 | 6/2020 | Joseph et al. |

\* cited by examiner

MEDIA PRESENTATION DEVICE WITH VOICE COMMAND FEATURE

REFERENCE TO RELATED APPLICATIONS

This is a continuation of U.S. patent application Ser. No. 16/388,078, filed Apr. 18, 2019, which claims priority to U.S. Provisional Patent Application No. 62/780,298, filed Dec. 16, 2018, the entirety of each of which is hereby incorporated by reference.

BACKGROUND

A typical media presentation device operates to receive and/or generate an analog or digital media stream representing media content such as video and/or audio content and to output the media content for presentation (i.e., to present the media content) on a user interface such as a display screen and/or an audio speaker. Examples of such devices include televisions, computer monitors, projection systems, loudspeakers, headphones, set-top boxes (e.g. cable or satellite TV receivers), digital video recorders, radios, personal computers, mobile communication devices, gaming consoles, and streaming media players, among others.

By way of example, a television or other display device could receive a media stream (e.g., over the air, from a set-top box, computer, mobile phone, or other device, through an Internet connection, or in another manner) and could present the media content of that stream to a user. As another example, a set-top box or other device could receive a broadcast stream from a content distributor and could output the media content of that stream via a High-Definition Multimedia Interface (HDMI) cable or other interface to a television and/or audio/video receiver for playout. As still another example, a digital video or audio recorder could likewise receive a broadcast stream, store the stream, and later retrieve and output content of the stream for playout. And as yet another example a loudspeaker or headphones could receive an audio stream from a radio, computer, mobile phone, or other device, and could present the audio content of that stream to a user. Numerous other examples are possible as well.

SUMMARY

When a media presentation device is presenting media content, it may be desirable for the media presentation device to perform certain actions in connection with the media content being presented. More particularly, if the media content defines a sequence of media content segments, it may be desirable for the media presentation device to perform certain actions in connection with presentation of certain ones of those media content segments, such as in relation to subject matter of the media content segments.

In an example implementation, the media presentation device might be presenting a content feed, such as a linear broadcast feed or on-demand feed, that includes program content segments, advertisement segments (e.g., commercials), and/or other content segments. And in so presenting that content feed, it may be desirable for the media presentation device to perform certain actions related to one or more such media content segments, such as action related to a subject matter of one or more such content segments. For instance, it may be desirable to enable user interaction with the media presentation device in connection with such a content segment, such as to facilitate user purchase of a good (e.g., product) or service related to subject matter of the content segment.

The present disclosure provides a mechanism to help achieve this.

In accordance with the disclosure, a media presentation device will determine one or more voice commands associated with a particular media content segment, and the media presentation device will detect utterance of such a determined voice command during or otherwise in relation to presentation of the media content segment and will respond to the detected utterance by performing an action that facilitates user purchase of a good or service associated with the media content segment.

In a representative implementation, the act of the media presentation device determining one or more voice commands associated with the particular media content segment could be based on digital fingerprint and/or watermark data, among other possibilities.

For example, the media presentation device could generate a fingerprint of the media content being presented or could extract a watermark from the media content being presented, and the media presentation device or a server interworking with the media presentation device could map the digital fingerprint or watermark to one or more associated voice commands that the media presentation device should listen for during presentation of the media content. The media presentation device could thus become dynamically set to listen for that particular voice command or variants of that particular voice command, as a trigger for then taking associated action.

The action that the media presentation device then takes in response to utterance of such a voice command, to facilitate user purchase of a good or service associated with the media content segment, could take various forms. For instance, the media presentation device could respond to utterance of such a voice command by adding the associated good or service to an electronic shopping cart associated with the user and/or authorizing or completing an associated purchase transaction. Further or alternatively, the media presentation device could respond to utterance of such a voice command by presenting the user with information about the associated good or service, prompting the user for associated input, logging the transaction, and/or presenting confirmation or other information related to the action.

By way of example, consider a scenario where the media content segment that relates in some way to a particular product or service, such as where the media content segment is an advertisement for the product or service, perhaps a commercial that specifically advertises the product or service or a television program segment that includes or references the product or service (e.g., pursuant to a product-placement agreement), among other possibilities. And assume that the product or service is offered for sale by a retailer named RETAILER 1.

In that case, the media presentation device could determine that the voice command "BUY AT RETAILER 1" is associated with the media content segment and that the media presentation device should therefore listen for utterance of that voice command while the media content segment is being presented. While at least part of the advertisement is being presented by the media presentation device, the media presentation device could then detect user utterance of that determined voice command, i.e., "BUY AT RETAILER 1," or a variant thereof, and the media presentation device could respond to that detected utterance by performing an action to facilitate the user purchasing of the product or service from RETAILER 1.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

It should also be understood that, throughout this disclosure, unless otherwise specified and/or unless the particular context clearly dictates otherwise, the term "a" or "an" means at least one, and the term "the" means the at least one.

DETAILED DESCRIPTION

Figure 1:
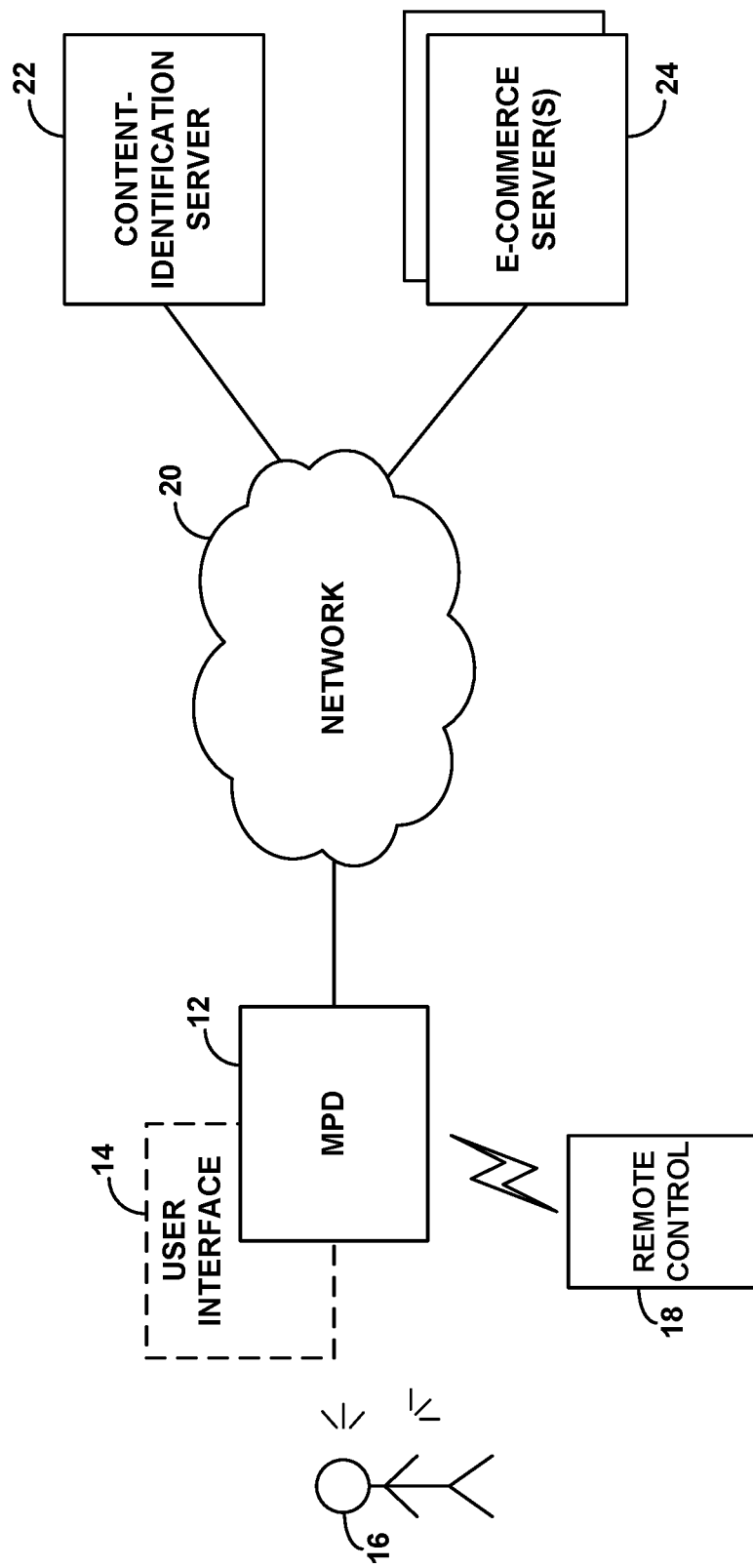
FIG. 1 is a simplified block diagram of an example system in which various disclosed principles can be implemented.

Referring to the drawings, as noted above, FIG. 1 is a simplified block diagram of an example system in which various disclosed principles can be implemented. It will be understood, however, that this and other arrangements and processes described herein can take various other forms. For instance, elements and operations can be re-ordered, distributed, replicated, combined, omitted, added, or otherwise modified. Further, it will be understood that functions described herein as being carried out by one or more entities could be implemented by and/or on behalf of those entities, through hardware, firmware, and/or software, such as by one or more processing units executing program instructions or the like.

As shown in FIG. 1, the example system includes a media presentation device 12, which could comprise any of the types of devices discussed above, or combinations or variants thereof, among other possibilities. As such, the media presentation device 12 could be configured to present media content on a user interface 14 that is part of the media presentation device or that is interconnected with the media presentation device, for receipt (e.g., viewing or listening) of the media content by a user 16.

For instance, the media presentation device could be a television, computer monitor, or other device that includes a display panel and/or sound speaker and that is configured to present video content on its display panel and/or audio content on its sound speaker. Or the media presentation device could be a set-top box, audio/video receiver, or other device that presents media content on an external user interface such as by outputting the media content through an HDMI cable or other interface to an external television, monitor, or sound speaker for playout.

Further, the media presentation device is shown possibly having an associated remote control 18, which might work through infrared and/or radio-frequency communication, among other possibilities, to control various operations of the media presentation device in response to input from user 16.

Although not shown in the figure, the media presentation device could include or be interfaced with a media source, from which the media presentation device could obtain the media content for presentation.

By way of example, the media presentation device could be in local communication with another device and could receive the media content from that other device. For instance, the media presentation device could be a television that is locally connected with a set-top box and could receive the media content from the set-top box, or the media presentation device could be a pair of headphones that is locally connected with a receiver or other media player and could receive the media content from that media player.

As another example, the media presentation device could be communicatively linked with content provider, such as a multichannel video program distributor, an Internet service provider, or a satellite radio provider and could receive the media content from that content provider. And as yet another example, the media presentation device could include or be in communication with a media storage drive or other storage mechanism (e.g., a digital media recorder or optical storage/media disc) and could retrieve the media content from that storage mechanism for playout. Numerous other examples are possible as well.

FIG. 1 shows the media presentation device in the example arrangement being interfaced with a network 20. Network 20 could be a wide area network such as the Internet and/or a local area network such as a home or corporate network for instance. And the media presentation device could be interfaced with this network through direct, indirect, wired, and/or wireless connection means.

Shown accessible through network 20 in the example system are then a content-identification server 22 and one or more e-commerce (e.g., online shopping) servers 24. With this arrangement, in relation to the media presentation device's presentation of a media content segment, the media presentation device could communicate with content-identification server 22 to ascertain one or more voice commands associated with the media content segment and perhaps information about one or more actions that the media presentation device should take in response to utterance of each such voice command. Further, the media presentation device could communicate with e-commerce server 24 to facilitate taking various such actions, such as to process part or all of an associated shopping transaction on behalf of the user, among other possibilities.

Figure 2:
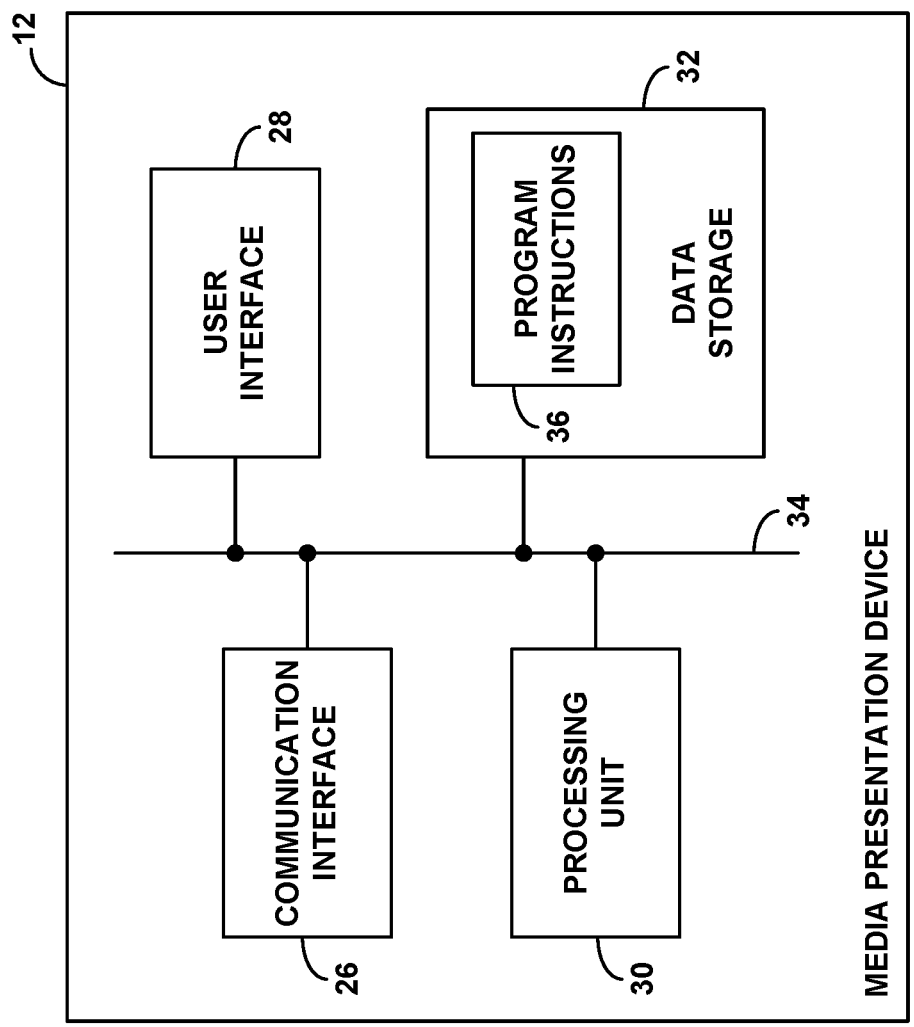
FIG. 2 is a simplified block diagram of an example media presentation device operable in the arrangement of FIG. 1.

FIG. 2 is next a simplified block diagram of an example media presentation device 12 that could be implemented in the arrangement of FIG. 1. The media presentation device could be any of the types of devices discussed above or combinations or variants thereof, among other possibilities. As shown by way of example, the media presentation device could include a communication interface 26, a user interface 28, a processing unit 30, and non-transitory data storage 32, any or all of which could be integrated together or interconnected with each other and/or with one or more other devices, systems, or other entities, through a connection mechanism 34.

Communication interface 26 could allow media presentation device 12 to connect and/or communicate with various other entities according to one or more protocols. For instance, the communication interface may enable the media presentation device to communicate with one or more content sources and with servers 22, 24 as noted above. As such, the communication interface might comprise a wired and/or wireless Ethernet interface, WIFI interface, cellular interface, or other network interface to facilitate network communication, and/or an HDMI interface, USB interface, BLUETOOTH interface, or other local media interface to facilitate local media communication. Connections and communications that the media presentation device has or forms through communication interface 26 or other interfaces could be direct or indirect, the latter passing through and/or traversing one or more entities, such as routers, switches, or other such devices.

User interface 28 could facilitate interaction between the media presentation device and a user, such as to present video and/or audio content to a user and/or to receive user input in relation to the content being presented or content to be presented. As such, the user interface 28 could include output components such as display device (which, for example, can be combined with a touch-sensitive panel) and/or a sound speaker as well as one or more drivers or other components for processing media content for presentation, and the user interface could include input components such as a keyboard, a keypad, a mouse, a touch-sensitive panel, a microphone, and/or a camera, also with associated drivers. Various such user interface components could be integral parts of the media presentation device or might be provided by an adjunct component, such as remote control 18, perhaps in local or network communication with the media presentation device, among other possibilities.

Processing unit 30 could then comprise one or more general purpose processors (e.g., microprocessors) and/or one or more specialized processors (e.g., digital signal processors and/or application specific integrated circuits).

And non-transitory data storage 32 could comprise one or more volatile, non-volatile, removable, and/or non-removable storage components, such as magnetic, optical, or flash storage, and/or can be integrated in whole or in part with processing unit 30. And data storage 32 could have stored thereon (e.g., encoded thereon or otherwise embodying) various data, including without limitation program instructions (e.g., compiled or non-compiled program logic and/or machine code) 36 that, when executed by processing unit 30, could cause the media presentation device to perform one or more operations, such as those described in this disclosure, possibly in response to receiving input through communication interface 26, user interface 28, or other means. As such, media presentation device 12 could be configured to perform one or more such operations.

Connection mechanism 34, and each other connection mechanism described in this disclosure, could be a mechanism that facilitates communication between two or more components, devices, systems, or other entities. As such, a connection mechanism could be a relatively simple mechanism, such as a cable or system bus, or a relatively complex mechanism, such as a packet-based communication network (e.g., the Internet) or other network. Further, in some instances, a connection mechanism could include a non-tangible medium, such as a wireless interface for instance.

The present disclosure will now focus on an example implementation where the media presentation device is a television or the like and where the media content comprises television media content, which the media presentation device might be receiving from a locally connected set-top box and/or over the air from a local television broadcast station for instance. It will be understood, however, that the disclosed principles could be applied as well in other contexts as well, such as with other media presentation devices, other media sources, and/or other types of media content.

In the example implementation, the media content that the media presentation device receives and presents could define a sequence of media content segments, and thus the media presentation device could sequentially present each segment, one after another. For instance, the media content could include a first television program segment (e.g., the first seven minutes of a one-hour television program), followed by an "ad pod" that comprises a series of television advertisement segments (e.g., six television advertisement segments that are each thirty seconds in length), followed by a second television program segment (e.g., the next seven minutes of the one-hour television program), and so on. This sequence of media content segments could be a linear broadcast television signal and/or a non-linear television signal, which could be received and/or presented as a predefined sequence and/or with particular segments presented on demand in response to user input or the like, among other possibilities.

Regardless of the manner in which the media presentation device presents media content segments, it can be desirable as noted above for the media presentation device to enable a user to conveniently purchase a good or service associated with a given such a media content segment.

To allow for this, as noted above, the media presentation device could be configured to determine one or more voice commands that the media presentation device should listen for during presentation of a particular media content segment, and the media presentation device could then detect user utterance of such a determined voice command during presentation of the media content segment and responsively perform an action to facilitate the user purchasing of a good or service associated with the media content segment.

In an example implementation, each voice command that the media presentation device determines that it should listen for during presentation of the media content segment could be associated with one or more product/service identifiers (e.g., universal product codes (UPCs), stockkeeping units SKUs, or the like), each identifying a product or service that is a subject of the media content segment. Thus, when the media presentation device detects utterance of a determined voice command during presentation of the media content segment, the media presentation device could take action to facilitate purchase of an associated identified product or service. And in a scenario where a given voice command is associated with more than one product or service, the media presentation device could prompt a user to make a selection of a given product or service, to facilitate the media presentation device taking the action to facilitate the purchase.

Further, each identified product or service identifier could be associated with one or more retailer identifiers (e.g., network addresses of retailer e-commerce sites), each identifying an entity from which the product or service can be purchased. Thus, when the media presentation device detects utterance of a determined voice command during presentation of the media content segment, the media presentation device could take action to facilitate purchase of an associated identified product or service from the associated identified retailer. And in a scenario where a product or service is associated with more than one retailer, the media presentation device could prompt a user to make a selection of a given retailer, to facilitate the media presentation device taking the action to facilitate the purchase from that retailer.

Alternatively, the present system could provide for purchases from a single retailer, in which case the media presentation device could be programmed to take actions to facilitate purchases from that retailer, and therefore it may be unnecessary to associate a voice command or product/service with a particular retailer.

Yet further, each voice command could be associated with one or more action identifiers (e.g., code or other data), each defining an action that the media presentation device should take in relation to purchase of the associated product or service upon detecting utterance of the voice command. For instance, representative actions could be "BUY" (e.g., to process purchase of the product or service) or "ADD TO CART" (e.g., to add the product or service to an online shopping cart), among other possibilities. In an example implementation, each such action identifier could be defined by a codeword that maps to program logic for carrying out the action.

The media presentation device could determine in various ways one or more voice commands that the media presentation device should listen for during presentation of the media content segment and, for each such voice command, the various associated information such as one or more product/service identifiers, one or more retailer identifiers, and/or one or more action identifiers, for instance.

In an example implementation, for instance, the media presentation device could do this through use of one or more forms of automated content recognition (ACR) technology. Further, the media presentation device could do this by itself and/or through interaction with one or more servers, such as content-identification server 22 for instance.

As one example, the media presentation device could use digital fingerprinting technology, with a digital fingerprint of the media content being mapped to one or more associated voice commands and associated information.

For instance, the media presentation device could generate a digital fingerprint of the media content that the media presentation device is presenting and could query the content-identification server 22 to determine one or more voice commands associated with the media content represented by the digital fingerprint and to determine various associated information.

In particular, the media presentation device could generate the digital fingerprint of the media content being presented and could transmit the generated fingerprint in a query message to the content-identification server. The content-identification server could then compare the generated digital fingerprint to one or more reference fingerprints using any fingerprint-comparison now known or later developed, and could thereby determine that the generated fingerprint matches a reference fingerprint of particular known media content, thus establishing that the media presentation device is presenting that particular media content.

Based on this detected match, the content-identification server could then determine one or more voice commands associated with that media content, perhaps one or more voice commands associated with the reference fingerprint that was deemed to match, and other associated information such as one or more product/service identifiers, one or more retailer identifiers, and one or more action identifiers. And the content-identifier server could transmit a data representation of the determined one or more voice commands and other associated information in a response to the media presentation device. Thus, the media presentation device could determine the one or more voice commands and associated information by receiving and reading this response from the content-identification server.

To facilitate this in an example implementation, the media presentation device could be configured to periodically generate digital fingerprints of whatever media content the media presentation device is currently presenting and to periodically transmit to the content-identification server the media presentation device's latest such generated digital fingerprints. For instance, the media presentation device could include a fingerprint-generator module (e.g., program instructions) that is configured to apply any suitable media fingerprinting process (e.g. any now known or later developed fingerprinting process) to generate these digital fingerprints representing the media content being presented, and the media presentation device could be configured to transmit those digital fingerprints within query messages to the content-identification server.

Considering video content, without limitation, an example digital fingerprinting process could apply on a per video frame basis and could involve establishing a representation of luminosity and/or other video characteristics. For instance, for a given video frame, the media presentation device could programmatically divide the frame into a grid, and the media presentation device could measure luminosity of the frame per grid cell and generate a bit string with each bit or series of bits representing luminosity per grid cell, or representing a weighted difference between the luminosity of certain defined pairs of the grid cells, or the like. Further, the media presentation device could apply this process to each frame, to each key frame, periodically, or on another defined basis, with each frame's bit string defining a digital fingerprint and/or with a specified hash, a combination or series of such bit strings or other representative values defining a digital fingerprint. And the media presentation device could send digital fingerprints to the content-identification server.

The content-identification server could thus regularly receive from the media presentation device the digital fingerprints most recently generated by the media presentation device, representing the media content being presented by the media presentation device. And the content-identification server could be configured to compare those fingerprints with reference fingerprints in an effort to find a match and to respond with voice-command data when appropriate.

In an example implementation, the content-identification server could be provisioned with reference data that includes reference digital fingerprints representing various known instances of media content, such as frames of particular media content segments, with each such reference fingerprint having been generated using the same fingerprint generation process that the media presentation device uses, so as to facilitate a fingerprint comparison. Further, the reference data could specify respectively for each reference fingerprint or each associated instance of media content various associated voice-command data that could be used by the media presentation device as a basis to facilitate user purchase of a product or service that is included in or otherwise related to the media content. For instance, the reference data could specify for each reference fingerprint or associated instance of media content one or more voice commands, one or more product/service identifiers, one or more retailer identifiers, and one or more action identifiers.

To facilitate this, the content-identification server or an associated provider could receive a copy of the media content and could generate the reference fingerprints using the same fingerprint generation process that the media presentation device would use, or the provider could receive the generated reference fingerprints. And the content-identification server or provider could receive from media content broadcasters, advertisers, retailers, or other entities, various voice-command data associated with the media content represented by each such reference fingerprint, such as one or more voice commands, one or more product/service identifiers, one or more retailer identifiers, and one or more action identifiers, among other possibilities.

Further, the content-identification server can store this information as the reference data in a relational database format or other manner. For instance, the reference data as stored could associate each reference fingerprint with one or more voice commands, and the reference data could associate each voice command with one or more product/service identifiers, one or more retailer identifiers, and one or more action identifiers.

In an example implementation, the reference data could associate each reference fingerprint with information that uniquely identifies the media content represented by the reference fingerprint. For a television advertisement segment, for instance, this could be a unique identifier such as an industry standard commercial identifier (ISCI) code and/or a database index number, or title, among other possibilities; and for another sort of media content segment, this information may take other forms. The reference data or other data could then correlate each such media content identifier with the associated voice-command data.

Further, each voice command that the reference data specifies for a reference fingerprint could be a voice command that is deemed desirable to detect a user uttering during presentation of the media content segment in order to trigger one or more associated actions related to facilitating a purchase of a product or service that is included in or otherwise related to the media content segment. And the reference data could specify each such voice command in a manner that, when provided or otherwise accessible to the media presentation device, could enable the media presentation device to listen for utterance of the voice command, or in a manner that could be converted to be so useable by the media presentation device. For instance, the reference data could specify each such voice command as a binary-coded text string or sequence of underlying phonemes, or in another manner.

Thus, when the content-identification server determines that a digital fingerprint representing media content being presented by the media presentation device matches a given reference fingerprint, the content-identification server could responsively obtain from the reference data various associated voice-command data, such as one or more voice commands, one or more product/service identifiers, one or more retailer identifiers, and one or more action identifiers, and could send the voice-command data to the media presentation device.

And the media presentation device could then read the response from the content-identification server and proceed accordingly. In particular, the media presentation device could proceed to apply any voice-recognition technique now known or later developed in order to listen for and detect utterance of each such specified voice command while continuing to present the media content. And upon detecting utterance of such a voice command while presenting the media content, the media presentation device could take one or more actions that could facilitate purchase of the associated product or service.

In this process, where the media presentation device is listening for utterance of one or more voice commands during presentation of a particular media content segment, the media presentation device could thus make the determination that a user of the media presentation device uttered the determined voice command while at least part of the media content segment was being presented.

The media presentation device could detect the user utterance of a particular voice command in various ways.

By way of example, the media presentation device could receive audio input representing user speech, perhaps through a microphone associated with the media presentation device. Such a microphone could be provided in various locations and could take various forms. For instance, the microphone could be embedded or otherwise integrated in the media presentation device itself and could be a far-field type microphone. Alternatively, the microphone could be embedded or otherwise integrated in remote control 18 and could be a near-field microphone.

And the media presentation device could then compare the received speech with the data representations of the one or more voice commands that the media presentation device is listening for, in an effort to find a match.

The media presentation device could conduct this comparison in various ways, including without limitation in a text domain or in an audio or frequency domain. For instance, to facilitate a comparison in the text domain, the media presentation device could translate the received speech into text (perhaps underlying phonemes) using any speech-to-text algorithm now known or later developed. And the media presentation device could compare that resulting text with the text representations of the one or more voice commands that the media presentation device is listening for. Whereas, to facilitate a comparison in the frequency domain, the media presentation device could translate the data representations of the one or more voice commands that it is listening for into audio waveform representations and could compare each such waveform with an audio waveform representation of the received speech.

In these or other processes, the media presentation device could consider an extent of similarity between the speech uttered by the user and a voice command that the media presentation device is listening for, as a basis to determine whether the user uttered the voice command. This can provide a practical tolerance level to help ensure that slight variations between the user's utterance and the voice command are effectively ignored for the purposes of triggering a desired action. Further, the media presentation device might be configured to allow for certain tolerable variations in voice commands.

In an alternative implementation, the media presentation device could interact with a smart-speaker or other microphone-equipped device that is positioned nearby, in order to determine that a user has uttered a particular voice command. For example, using an application programming interface (API) defined by the nearby device or by an associated system, the media presentation device could engage in local network communication with the nearby device to direct the device to listen for utterance of one or more particular voice commands. The nearby device could then apply voice-recognition technology to recognize user utterance of such a voice command and could responsively transmit to the media presentation device a message indicating the detected utterance. Thus, the media presentation device could determine that the user uttered the voice command by receiving from the nearby device a message indicating that the user uttered the voice command.

As noted above, the action that the media presentation device takes in response to detecting utterance of a given voice command during presentation of the associated a media content segment could take various forms. Further, the action could involve interaction between the media presentation device and one of the one or more e-commerce servers 24, each operated by a respective retailer for instance.

To facilitate this, a user of the media presentation device might enter into the media presentation device various account information for a shopping account that the user has with each such retailer, so as to authorize and enable the media presentation device to interact with the retailer's e-commerce server on behalf of the user. Further, the e-commerce server might provide an API to allow direct shopping interaction, or the media presentation device might interact with a more conventional user interface provided by the e-commerce server. Still further, the media presentation device could operate a thin client, with a bulk of the shopping-cart processing carried out by the e-commerce server.

An example action could be the media presentation device presenting to the user various information about or related to the good or service at issue, perhaps in response to a voice command such as "SHOW PRODUCT INFO" or "SHOP FOR PRODUCT". To facilitate this, the media presentation device might retrieve from an e-commerce server information such as price, availability, and/or additional selection options (e.g., size, color, version, retailer from which to purchase, etc.) of the product/service associated with the voice command. And the media presentation device may present the retrieved information to the user, in a pop-up window or other form and perhaps prompt the user for input such as selection from the options noted above, receiving user response through remote-control input, voice-command input, touch-screen input, or in other ways.

Another action could be the media presentation device adding an item to the user's online (electronic) shopping cart with the retailer, perhaps in response to an "ADD TO CART" voice command as discussed above. To facilitate this, the media presentation device may engage an add-to-cart operation provided by the e-commerce server, to add the product or service associated with the voice command to the user's shopping cart.

Yet another action could be the media presentation device fully engaging in or completing a purchase transaction with the retailer, perhaps in response to a "BUY" voice command as discussed above. For instance, the media presentation device could engage a buy operation provided by the e-commerce server, to process purchase of the product or service associated with the voice command. And if the item is already in the user's shopping cart, the media presentation device could engage a buy operation provided by the e-commerce server, to complete a purchase of the item. Numerous other actions could possible as well.

Consider next an example scenario where the media content segment at issue is an advertisement for a particular soft drink or is otherwise related to the soft drink, and where the soft drink is offered for sale by RETAILER 1.

In that scenario, the reference data may associate reference fingerprint representing the media content segment with a UPC for that particular soft drink and with an identifier of RETAILER 1, and the reference data may further associate the reference fingerprint with the voice command "BUY" and with a BUY action code. Based on a determination that a digital fingerprint representing the media content being represented by the media presentation device matches that reference fingerprint, the media presentation device may therefore start listening for utterance of the voice command "BUY" during presentation of the media content segment. And upon detecting utterance of that voice command or a variant thereof, the media presentation device could then responsively take a BUY action to process a user purchase of the soft drink from RETAILER 1.

Further alternatively or additionally, the reference data may associate the reference fingerprint with the voice command "BUY AT RETAILER 1" to help ensure that the user wishes to buy the soft drink from RETAILER 1. Thus, here similarly, upon detecting utterance of this voice command or a variant thereof, the media presentation device could responsively take action to process a user purchase of the soft drink from RETAILER 1.

Alternatively or additionally, the media presentation device and/or content-identification server might be set to provide the present service with respect to just RETAILER 1. And in that case the reference data may not indicate the retailer identifier but the media presentation device, possibly upon directive from the content-identification server, may still respond to utterance of the voice command "BUY" by taking action to process a user purchase of the soft drink from RETAILER 1.

As another example, consider a variation where the soft drink that is a subject of the media content segment is available for purchase from more than one retailer, such as RETAILER 1, RETAILER 2, and RETAILER 3. In this case, the reference data might associate the reference fingerprint with the "BUY" voice command and with subsidiary voice commands "RETAILER 1", "RETAILER 2", and "RETAILER 3". The media presentation device could then listen for utterance of the voice command "BUY", and upon detecting utterance of that voice command could then present to the user an audio or video prompt to select from the list of retailers by speaking a retailer name. Upon detecting user utterance of one of the retailers, the media presentation device could then take action to process a user purchase of the soft drink from that retailer.

Alternatively or additionally, the reference data might associate the reference fingerprint with separate voice commands per retailer, such as "BUY AT RETAILER 1," "BUY AT RETAILER 2," "BUY AT RETAILER 3," each with a respective retailer code. Thus, the media presentation device could listen for utterance of one of these voice commands. And upon detecting utterance of one of these voice commands, the media presentation device could then take action to process a user purchase of the soft drink from the retailer associated with the detected utterance.

Likewise, consider a variation where the media content segment includes or is related with multiple different products and/or services, such as PRODUCT 1, PRODUCT 2, and PRODUCT 3. In that case, case, the reference data might associate the reference fingerprint with the "BUY" (or "BUY AT . . . ") voice commands and with subsidiary voice commands "PRODUCT 1", "PRODUCT 2", and "PRODUCT 3". The media presentation device could then listen for utterance of the voice command "BUY", and upon detecting utterance of that voice command could then present to the user an audio or video prompt for the user to select from the list of products by speaking the product name. Upon detecting user utterance of one of the products, the media presentation device could then take action to process a user purchase of that product.

Alternatively or additionally, the reference data might associate the reference fingerprint with separate voice commands per product/service, such as "BUY PRODUCT 1," "BUY PRODUCT 2," "BUY PRODUCT 3" (perhaps further in relation to one or more retailers), each with a respective product code. Thus, the media presentation device could listen for utterance of one of these voice commands. And upon detecting utterance of one of these voice commands, the media presentation device could then take action to process a user purchase of the uttered product.

As a specific example of this, if an advertisement segment promotes different soft drinks, namely a regular cola and a diet cola, the reference data may associate a reference fingerprint of that advertisement segment with the voice commands "BUY COLA" and "BUY DIET COLA," for instance, each of which, when spoken during presentation of the advertisement segment could constitute a command to buy the spoken type of soft drink. And here similarly, the voice command "BUY" or the like, when uttered during presentation of the advertisement segment, might be ambiguous and might cause the media presentation device to prompt the user for further input to determine which product the user would like to purchase.

In an example implementation, this fingerprint-related process could be considered to enable a listening mode of the media presentation device in which the media presentation device listens for utterance of one or more associated voice commands. For instance, detecting that a digital fingerprint representing media content being presented by the media presentation device matches a reference fingerprint could cause the media presentation device to start listening for utterance of one or more associated voice commands during presentation of a particular media content segment.

So enabling the listening mode could involve starting to receive audio through a microphone, perhaps directing a remote control or nearby smart speaker or other device to start receiving audio. Further or alternatively, enabling the listening mode could involve starting to analyze such audio input to determine whether the audio input represents utterance of such a voice command. For instance, the media presentation device could so start analyzing audio received by a microphone in the media presentation device or in a remote control. Or the media presentation device could direct a nearby smart speaker or other such device to start analyzing the audio.

In this process, the digital fingerprint that the media presentation device sends to the content-identification server could be of at least a portion of the media content segment that includes or otherwise relates to the particular product or service at issue. For instance, as the media presentation device starts presenting a commercial for a specific product or service, the media presentation device could generate and transmit to the content-identification server a digital fingerprint representing the media content of that commercial, perhaps as its latest generated digital fingerprint. And upon finding that that digital fingerprint matches a reference fingerprint representing a portion of the commercial, the content-identification server could obtain from the reference data and provide to the media presentation device the associated voice-command data. Thus, the media presentation device could immediately start listening for one or more indicated voice commands and could take action in response to utterance of such a voice command.

Alternatively, the digital fingerprint that the media presentation device sends to the content-identification server could be for media content that is known to precede the media content segment at issue—such as for program content and/or another commercial that is scheduled to precede the media content segment at issue. And in that case, the content-identification server might find a fingerprint match and thereby determine in advance that the media presentation device is going to present the media content segment that includes or otherwise relates to the particular product or service. Thus, the content-identification server could provide the media presentation device with the associated voice command in advance of the media presentation device's presentation of that media content segment, to help prepare the media presentation device to listen for utterance of that voice command.

In this latter implementation, the reference data could further specify for a given reference fingerprint a time offset or other timing information that indicates when the media content segment will begin in a continued stream of media content, and the content-identification server could provide this timing information in its response to the media presentation device. Thus, the media presentation device could use this timing information as a basis to determine when to begin listening for utterance of the one or more indicated voice commands.

Further, a similar fingerprint-related process could then be used to disable the media presentation device's listening mode, so as to stop the media presentation device from listening for utterance of the one or more voice commands at the end of the media content segment that included or otherwise related to a particular product or service and/or to stop a nearby smart speaker or other device from doing so.

For example, the reference data could include one or more reference fingerprints representing the end of the media content segment and could associate each such reference fingerprint with a disable-listening-mode action. Thus, based on a determination that a digital fingerprint representing the media content being represented by the media presentation device matches that reference fingerprint, the media presentation device could responsively stop listening for utterance of one or more voice commands that the media presentation device was listening for during presentation of the media content segment and/or could direct a nearby smart speaker or other device to stop doing so.

This enabling and disabling the media presentation device's listening mode could help ensure that the media presentation devices accurately listens for and detects voice commands that it is meant to be listening for at any given time. For instance, this process could help ensure that, during presentation of a given media content segment that includes or otherwise relates to a particular product or service, the media presentation device listens for certain voice commands that would trigger action to facilitate purchase of that product or service, but that once the media content segment ends, the media presentation device stops listening for such voice commands.

To facilitate this, through fingerprint analysis or other means, the media presentation device could determine when presentation of media content segment related to the product or service starts, and the media presentation device could then responsively enable its listening mode, starting to listen for the one or more voice commands determined to be associated with the media content segment. And likewise, through fingerprint analysis or other means, the media presentation device could determine when presentation of that media content segment is completed, and the media presentation device could then responsively disable its listening mode, discontinuing its listening for the one or more voice commands determined to be associated with the media content segment.

Alternatively, if reason exists to allow detection and response to such voice commands even after the media content segment ends (such as for a short timer afterwards), the media presentation device's listening mode could be extended in time accordingly.

Note further that various features described herein as being carried out by a content-identification server could instead be carried out by the media presentation device itself. For instance, the media presentation device could receive in advance from the content-identification server or from one or more other entities the reference data described above and could store the reference data locally.

As the media presentation device generates digital fingerprints of the media content that it is presenting, the media presentation device could then itself compare the generated digital fingerprints with the reference fingerprints. And upon detecting a match with a reference fingerprint, the media presentation device could then determine from the reference data one or more associated voice commands that the media presentation device should listen for, and other information such as one or more product/service identifiers, retailer identifiers, and action identifiers. And the media presentation device could then responsively proceed as discussed above, listening for utterance of one of the voice commands, and upon detecting the utterance, taking action to facilitate user purchase of an associated product or service. Using this local caching-type approach, the media presentation device can avoid the need to query the content-identification server each time it generates a fingerprint.

Alternatively or additionally, content identification could be used as a basis to dynamically provision the media presentation device with relevant reference data for the media content that the media presentation device is presenting. For example, if the media presentation device is presenting a linear content feed and periodically providing digital fingerprints to the content-identification server, the content-identification server could use fingerprint matching to identify the media feed being presented. And upon so identifying the media feed being presented, the content-identification server could then transmit to the media presentation device a set of reference data having reference fingerprints for an upcoming portion of the linear feed. That way, the media presentation device could then compare its generated digital fingerprints with that set of reference fingerprints moving forward. Further, this process could repeat for subsequent time segments of the linear feed.

While fingerprints can thus be used as a basis to facilitate voice command operations enabling user purchase of a product or service during presentation of a media content segment, other forms of ACR or related technology could be used in addition or instead.

By way of example, the media presentation device could make use of watermark-based technology, based on a watermark encoded into the media content that is being received and presented by the media presentation device.

In an example implementation, for instance, a content broadcaster, content distributor, or other entity could encode into the media content a watermark that can be mapped to voice-command information.

In media content that contains an audio component, watermarking could be done in the audio domain. In this context, audio could be any type of signal that has a frequency falling within the normal human audibility spectrum. For example, audio may be speech, music, an audio portion of an audio and/or video program (e.g., a television program, a movie, an Internet video, a radio program, a commercial spot, etc.), noise, or any other sound.

In general, encoding of audio could then refer to inserting one or more codes into the audio. In some examples, such a code could be psycho-acoustically masked so that the code is inaudible to human hearers of the audio. However, there may be certain situations in which the code may be audible to certain human listeners. These codes may also be referred to as watermarks.

The codes that are embedded in audio could be of any suitable length, and any suitable technique for mapping information to the codes could be utilized. Furthermore, the codes could be converted into symbols that are represented by signals having selected frequencies that are embedded in the audio. For instance, any suitable encoding and/or error correcting technique could be used to convert codes into symbols. Examples of such codes include, without limitation, Nielsen audience measurement codes (Nielsen codes), which are proprietary to The Nielsen Company (US), LLC. A Nielsen code is any code embedded into any media content by and/or in association with The Nielsen Company (US), LLC or any affiliate(s) of The Nielsen Company (US), LLC. For instance, before and/or during transmission and/or broadcasting, media content could be encoded to include one or more such codes. When the media content is then presented by the media presentation device, people in the area of the presentation may not only be exposed to the media content, but, unbeknownst to them, may also be exposed to the code(s) embedded in the media content.

Alternatively or additionally, watermark codes could embedded or otherwise encoded into other types of media content. More generally, such codes could be encoded into audio content, video content, graphical content, an image, a game, a survey, and/or a webpage, among other possibilities. Further, such a watermark might directly encode metadata content. For instance, the watermark might be encoded in a first metadata format that could be transcoded into a second metadata format, such as a textual representation of information, perhaps a base-64 hexadecimal string of characters or the like.

As the media presentation device is presenting the media content, the media presentation device could detect and extract the watermark from the media content and could responsively use the extracted watermark as a basis to determine voice-command information of the type discussed above, such as one or more voice commands, one or more product/service identifiers, one or more retailer identifiers, and one or more action identifiers. And the media presentation device could then operate as discussed above, to listen for utterance of such a voice command during presentation of the media content and, upon detecting utterance of the voice command, to take an action that facilitates user purchase of an associated product or service.

To facilitate this in an example implementation, the media presentation device could be configured to regularly analyze the media content that it is presenting, in search of a watermark, such as a watermark having a known format indicating that it is a watermark.

Further, the content-identification server could be provisioned with reference data that associates various reference watermarks with various known instances of media content, such as specific media content segments (e.g., commercials or the like) and that specifies respectively for each reference watermark or each associated instance of media content various associated voice-command data that could be used by the media presentation device as a basis to facilitate user purchase of a product or service that is included in or otherwise related to the media content. For instance, similar to the fingerprint data discussed above, the reference data could specify for each reference watermark or associated instance of media content one or more voice commands, one or more product/service identifiers, one or more retailer identifiers, and one or more action identifiers.

As above, the content-identification server could receive this reference data from one or more entities and could store this information in a relational database or other format. For instance, the reference data as stored could associate each reference watermark with a unique content identification and with one or more voice commands, and the reference data could associate each voice command with one or more product/service identifiers, one or more retailer identifiers, and one or more action identifiers.

Thus, as above, when the content-identification server determines that the watermark extracted from the media content being presented by the media presentation device matches a given reference watermark, the content-identification server could responsively obtain from the reference data various associated voice-command data, such as one or more voice commands, one or more product/service identifiers, one or more retailer identifiers, and one or more action identifiers, and could send the voice-command data to the media presentation device.

And the media presentation device can then likewise read the response from the content-identification server and proceed accordingly. In particular, the media presentation device could proceed to apply any voice-recognition technique now known or later developed in order to listen for and detect utterance of each such specified voice command while continuing to present the media content. And upon detecting utterance of such a voice command while presenting the media content, the media presentation device could take one or more actions that could facilitate user purchase of the associated product or service.

Various aspects discussed above can be extended to apply in this context as well, and vice versa.

By way of example, watermarks extracted from the media content being presented by the media presentation device could be considered to enable or disable a listening mode of the media presentation device in which the media presentation device listens for utterance of one or more associated voice commands. For instance, extracting a particular watermark from the media content could cause the media presentation device to start listening for utterance of one or more associated voice commands during presentation of a particular media content segment, such as immediately or at a specified time offset as discussed above. And extracting a next or other watermark from the media content could cause the media presentation device to stop listening for utterance of the one or more voice commands at the end of a media content segment at issue.

And as another example, the media presentation device could receive in advance from the content-identification server or from one or more other entities the watermark-based reference data described above and could store the reference data locally. And when the media presentation device extracts from the media content a watermark and detects that the watermark extracted watermark matches one of the reference watermarks, the media presentation device could then determine from the reference data one or more associated voice commands that the media presentation device should listen for, and other information such as one or more product/service identifiers, retailer identifiers, and action identifiers. And the media presentation device could then responsively proceed as discussed above, listening for utterance of one of the voice commands, and upon detecting the utterance, taking action to facilitate user purchase of an associated product or service.

Further, watermark-based content-identification could be used as a basis to dynamically provision the media presentation device with relevant reference data for the media content that the media presentation device is presenting. For example, if the media presentation device is presenting a linear content feed, a watermark could be included in that content feed in advance of a media content segment related to a particular product or service. And the media presentation device could extract and report that watermark to the content-identification server.

The content-identification server could then use that watermark as a basis to identify the media feed being presented. And upon so identifying the media feed, the content-identification server could then transmit to the media presentation device a set of reference data having reference watermarks for an upcoming portion of the linear feed. That way, the media presentation device could then compare any further extracted watermarks with that set of reference watermarks moving forward. And this process could likewise repeat for subsequent time segments of the linear feed.

In addition, certain combinations of the watermarking and fingerprint technologies could be used to facilitate other variations. For instance, a watermark extracted from the media content being presented by the media presentation device could trigger the content-identification server provisioning the media presentation device with reference-fingerprint data for an upcoming portion of the media content, to facilitate fingerprint matching and associated determination of voice-command information as discussed above. And likewise, a fingerprint generated based on the media content being presented by the media presentation device could trigger the content-identification server provisioning the media presentation device with reference-watermark data for an upcoming portion of the media content, to facilitate fingerprint matching and associated determination of voice-command information as discussed above.

Note also that watermark-related technology can be used in other ways and could provide additional benefits in the context of the present disclosure.

For instance, a watermark embedded in media content that that the media presentation device is presenting could itself expressly encode voice-command related information, such as one or more voice commands, one or more product/service identifiers, one or more retailer identifiers, and/or one or more action identifiers associated with a media content segment. In that case, the media presentation device could thus extract the watermark and directly read the voice-command information so as to proceed as discussed above. For instance, such a watermark could be included in the media content at the start of a media content segment that includes or otherwise relates to a particular product or service, so as to facilitate having the media presentation device start listening for utterance of the one or more voice commands at that time.

Further, a watermark could encode various other information associated with this process. For example, watermark could include timing information specifying or otherwise indicating when the media presentation device should enable or disable a listening mode as described above. Such timing information could include a timing offset indicates a duration from where the watermark was included, in which case the media presentation device should enable or disable the listening mode upon passing of that duration. Or the timing information could be a timestamp of an upcoming time when the media presentation device should enable or disable the listening mode, in which case the media presentation device can wait for the indicated time to arrive and could then responsively enable or disable the listening mode.

Note also that, in addition to fingerprint-based and watermark-based ACR technology, the media presentation device could determine voice-command information associated with a media content using other types of technology as well.

For example, triggers similar to the watermarks discussed above could be carried as out-of-band signals (e.g., Society of Cable and Telecommunications Engineers (SCTE) triggers) within a transport stream carrying the media, such as within packet headers or the like. If the media presentation device receives such a transport stream, then the media presentation device could read such out-of-band triggers from the stream and could carry out operations analogous to those discussed above with respect to watermarks. Alternatively, an intermediary within a communication path of the media en route to the media presentation device could read such out-of-band triggers and could instruct the media presentation device accordingly or could convert the out-of-band triggers into watermarks encoded into the media content for use by the media presentation device as discussed above.

And as another example, the media presentation device could employ techniques rooted in artificial intelligence and/or machine learning pattern matching to determine voice-command information associated with the media content.

In addition, in any of the processes noted above, when the media presentation device is operating with its listening mode enabled, the media presentation device could be configured to present a notification related to its listening mode. For instance, if the media content comprises video content such as television content or the like, the media presentation device could generate and present as a graphical overlay superimposed over the video content a message such as "If you'd like to purchase this item at RETAILER 1, say 'BUY AT RETAILER 1' now." Further, where various options exist, such as when a choice of product/service or retailer exists, the media presentation device could similarly present those options.

Further, the media presentation device could also present information confirming that an action has been performed. For instance, if the media presentation device has added an item to the user's shopping cart, the media presentation device could present a notification indicating so. Or if the media presentation device has completed a purchase transaction, the media presentation device could present a notification indicating so.

In addition, the media presentation device could log a record of the performed action, perhaps along with other potentially relevant information, such as user activity at or near the time of the action. This information could then be further analyzed and used to guide decisions regarding future advertisement campaigns, voice-command associations, configurations, and the like.

Figure 3:
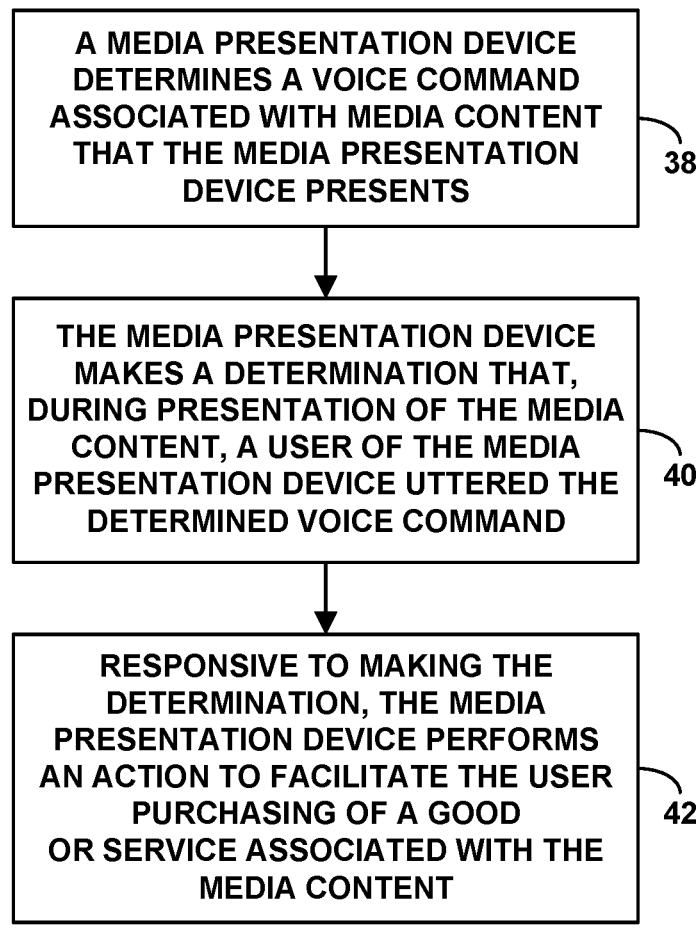
FIG. 3 is a flow chart depicting a method that can be carried out in accordance with the present disclosure.

FIG. 3 is a flow chart depicting a method that can be implemented by a media presentation device in accordance with the present disclosure. The media presentation device could comprise one or more of the devices noted above, among other possibilities. And this method could be carried out by the media presentation device in relation to media content that the media presentation device presents. As shown in the figure, at block 38, the media presentation device determines a voice command associated with the media content. At block 40, the media presentation device then makes a determination that, during presentation of the media content, a user of the media presentation device uttered the determined voice command. And at block 42, responsive to making the determination, the media presentation device performs an action to facilitate the user purchasing of a good or service associated with the media content.

In line with the discussion above, the media content that the media presentation device presents could include a media content segment such as a television advertisement segment and/or a television program segment, and the media content segment could include or reference the good or service. In that case, as discussed above, the act of making the determination that the user uttered the determined voice command during the presenting of the media content could involve determining that the user uttered the determined voice command during the presentation of the media content segment.

Further, as discussed above, the method could include the media presentation device enabling a listening mode in which the media presentation device listens for utterance of the determined voice command through a microphone during the presentation of the media content segment and, while the listening mode is enabled, presenting a message related to the voice command and/or the listening mode. And the method could then include the media presentation device disabling the listening mode upon completion of presentation of the media content segment.

As additionally discussed above, the act of determining the voice command associated with the media content could involve determining the voice command based on a fingerprint generated from the media content and/or a watermark extracted from the media content.

For instance, the media presentation device could generate a fingerprint of the media content, transmit the generated fingerprint to a server (e.g., a content-identification server), and responsive to transmitting the generated fingerprint to the server, receive from the server information relating to the media content, the information including the voice command associated with the media content. Or the media presentation device could receive from a server data that associates one or more fingerprints with one or more respective voice commands, generate a fingerprint of the media content, and use the generated fingerprint and the received data as a basis to determine the voice command associated with the media content.

Alternatively or additionally, the media presentation device could extract a watermark (e.g., a psycho-acoustically masked watermark) from the media content, transmit the extracted watermark to a server, and responsive to transmitting the extracted watermark to the server, receive from the server information relating to the media content, the information including the voice command associated with the media content. Or the media presentation device could receive from a server data that associates one or more watermarks with one or more respective voice commands, extract a watermark from the media content, and use the extracted watermark and the received data as a basis to determine the voice command associated with the media content.

As further discussed above, the act of making the determination that the user of the media presentation device uttered the determined voice command during the presenting of the media content could involve detecting, via a microphone associated with the media presentation device (e.g., in the media presentation device or in a remote control in wireless communication with the media presentation device), that the determined voice command was uttered during the presenting of the media content. For instance, the media presentation device could determine that audio received by the microphone represents utterance of the voice command.

Still further, as discussed above, the action performed by the media presentation device to facilitate the user purchasing the good or service associated with the media content segment could involve presenting information about the good or service, prompting the user for input, adding the good or service to an electronic shopping cart, or processing purchase of the good or service, among other possibilities.

Yet further, as discussed above, the media presentation device could present information confirming its performance of the action. And the media presentation device could log a record of the performed action.

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Still further, various operations described above could be defined by program instructions stored on a non-transitory computer readable medium, the program instructions being executable by a processing unit to carry out the operations. Such a non-transitory computer readable medium could then be provided, integrated, or otherwise implemented at the media presentation device and/or another entity.

Although certain variations have been discussed in connection with one or more examples of this disclosure, these variations can also be applied to all of the other examples of this disclosure as well.

Further, although select examples of this disclosure have been described, alterations and permutations of these examples will be apparent to those of ordinary skill in the art. Other changes, substitutions, and/or alterations are also possible without departing from the invention in its broader aspects.

The invention claimed is:

1. A method comprising:
presenting, by a media presentation device, media content;
determining, by the media presentation device, a voice command associated with the media content, wherein determining the voice command associated with the media content comprises (i) generating a fingerprint of the media content, (ii) transmitting the generated fingerprint to a server, and (iii) responsive to transmitting the generated fingerprint to the server, receiving from the server, information relating to the media content, wherein the information comprises the voice command associated with the media content;
making a determination, by the media presentation device, that, during the presenting of the media content, a user of the media presentation device uttered the determined voice command; and
responsive to making the determination, performing, by the media presentation device, an action to facilitate the user purchasing of a good or service associated with the media content.

2. The method of claim 1,
wherein the media content comprises a media content segment selected from the group consisting of a television advertisement segment and a television program segment,
wherein the media content segment includes or references the good or service, and
wherein making the determination that the user uttered the determined voice command during the presenting of the media content comprises determining that the user uttered the determined voice command during the presenting of the media content segment.

3. The method of claim 2, further comprising:
enabling, by the media presentation device, a listening mode in which the media presentation device listens for utterance of the determined voice command through a microphone during the presenting of the media content segment.

4. The method of claim 3, further comprising:
disabling, by the media presentation device, the listening mode upon completion of the presenting of the media content segment.

5. The method of claim 3, further comprising:
while the listening mode is enabled, presenting, by the media presentation device, a message related to at least one of the voice command or the listening mode.

6. The method of claim 2, wherein the action is to facilitate the user purchasing the good or service associated with the media content segment and comprises at least one of:
(i) presenting information about the good or service;
(ii) prompting the user for input;
(iii) adding the good or service to an electronic shopping cart; or
(iv) processing purchase of the good or service.

7. The method of claim 1, wherein making the determination that the user of the media presentation device uttered the determined voice command during the presenting of the media content comprises:
detecting, via a microphone associated with the media presentation device, that the determined voice command was uttered during the presenting of the media content.

8. The method of claim 7, wherein the microphone is in a remote control that is in wireless communication with the media presentation device, and wherein detecting via the microphone that the determined voice command was uttered during the presenting of the media content comprises:
determining that audio received by the microphone represents utterance of the voice command.

9. The method of claim 1, further comprising:
presenting, by the media presentation device, information confirming performance of the action.

10. The method of claim 1, further comprising:
logging, by the media presentation device, a record of the performed action.

11. A non-transitory computer-readable medium having stored thereon program instructions that, when executed by a processor, cause a media presentation device to perform operations comprising:
presenting media content;
determining a voice command associated with the media content, wherein determining the voice command associated with the media content comprises (i) generating a fingerprint of the media content, (ii) transmitting the generated fingerprint to a server, and (iii) responsive to transmitting the generated fingerprint to the server, receiving from the server, information relating to the media content, wherein the information comprises the voice command associated with the media content;
making a determination that, during the presenting of the media content, a user of the media presentation device uttered the determined voice command; and
responsive to making the determination, performing an action to facilitate the user purchasing of a good or service associated with the media content.

12. The non-transitory computer-readable medium of claim 11, wherein the media content comprises a media content segment selected from the group consisting of a television advertisement segment and a television program segment, wherein the media content segment includes or references the good or service, and wherein making the determination that the user uttered the determined voice command during the presenting of the media content comprises determining that the user uttered the determined voice command during the presenting of the media content segment.

13. The non-transitory computer-readable medium of claim 12, wherein the operations further comprise:

enabling a listening mode in which the media presentation device listens for utterance of the determined voice command through a microphone during the presenting of the media content segment.

14. The non-transitory computer-readable medium of claim 13, wherein the operations further comprise:

disabling the listening mode upon completion of the presenting of the media content segment.

15. A media presentation device comprising:

a communication interface;

a user interface;

a processing unit;

non-transitory data storage; and program instructions stored in the non-transitory data storage and executable by the processing unit to cause the media presentation device to carry out operations including:

presenting media content, determining a voice command associated with the media content, wherein determining the voice command associated with the media content comprises (i) generating a fingerprint of the media content, (ii) transmitting the generated fingerprint to a server, and (iii) responsive to transmitting the generated fingerprint to the server, receiving from the server, information relating to the media content, wherein the information comprises the voice command associated with the media content, making a determination that, during the presenting of the media content, a user of the media presentation device uttered the determined voice command, and responsive to making the determination, performing an action to facilitate the user purchasing of a good or service associated with the media content.

16. The media presentation device of claim 15, wherein the media presentation device is at least one of a television or a set-top box.

17. The media presentation device of claim 15, wherein the media content comprises a media content segment selected from the group consisting of a television advertisement segment and a television program segment, wherein the media content segment includes or references the good or service, and wherein making the determination that the user uttered the determined voice command during the presenting of the media content comprises determining that the user uttered the determined voice command during the presenting of the media content segment.

18. The media presentation device of claim 17, wherein the operations additionally include:

enabling a listening mode in which the media presentation device listens for utterance of the determined voice command through a microphone during the presenting of the media content segment.

19. The media presentation device of claim 18, wherein the operations additionally include:

disabling the listening mode upon completion of the presenting of the media content segment.

20. The media presentation device of claim 18, wherein the operations additionally include:

while the listening mode is enabled, presenting a message related to at least one of the voice command or the listening mode.

* * * * *